United States Patent
Palazzolo et al.

(10) Patent No.: US 11,027,683 B1
(45) Date of Patent: Jun. 8, 2021

(54) OCCUPANT RESTRAINT SYSTEM AND RELATED METHODS

(71) Applicant: Continental Automotive Systems, Inc., Auburn Hills, MI (US)

(72) Inventors: Christopher James Palazzolo, Littleton, CO (US); Robert M. Andres, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/703,146

(22) Filed: Dec. 4, 2019

(51) Int. Cl.
| | |
|---|---|
| *B60N 2/42* | (2006.01) |
| *B60N 2/427* | (2006.01) |
| *B60R 21/013* | (2006.01) |
| *B60N 2/80* | (2018.01) |
| *B60N 2/10* | (2006.01) |
| *B60R 22/26* | (2006.01) |
| *B60R 22/12* | (2006.01) |
| *B60R 22/34* | (2006.01) |
| *B60N 2/015* | (2006.01) |

(52) U.S. Cl.
CPC ............ *B60R 21/013* (2013.01); *B60N 2/015* (2013.01); *B60N 2/10* (2013.01); *B60N 2/80* (2018.02); *B60R 22/12* (2013.01); *B60R 22/26* (2013.01); *B60R 22/34* (2013.01); *B60R 2022/3402* (2013.01)

(58) Field of Classification Search
CPC .. B60N 2/015; B60N 2/10; B60N 2/80; B60R 21/013; B60R 22/12; B60R 22/26; B60R 22/34; B60R 2022/3402
USPC ..................... 297/216.1, 464, 487
See application file for complete search history.

(56) References Cited

U.S. PATENT DOCUMENTS

| | | | | |
|---|---|---|---|---|
| 2,025,822 A | * | 12/1935 | Pryor ..................... | B60R 21/08 280/749 |
| 3,214,117 A | * | 10/1965 | James .................... | B64D 25/02 244/122 A |
| 3,692,327 A | * | 9/1972 | Barrick, Sr. ............ | B60R 21/08 280/749 |
| 3,753,576 A | * | 8/1973 | Gorman ................ | B60R 21/207 280/730.1 |
| 3,774,937 A | * | 11/1973 | Otani ..................... | B60R 22/14 297/483 |

(Continued)

FOREIGN PATENT DOCUMENTS

| | | | | |
|---|---|---|---|---|
| CA | | 2563649 A1 | 3/2008 | |
| DE | 102004024548 A1 | * | 12/2005 | ............. B60R 22/14 |

(Continued)

OTHER PUBLICATIONS

International Search Report and the Written Opinion of the International Searching Authority dated Feb. 1, 2021 for the counterpart PCT Application No. PCT/US2020/070865.

*Primary Examiner* — Rodney B White

(57) ABSTRACT

An occupant restraint system including a seat having a head rest where the seat has a seat belt anchor, a seat belt retractor and a seat coupling member each coupled with the seat. The system further includes a seat belt assembly including a first seat belt portion and a second seat belt portion. At least one deployable restraint is stored on or within at least one of the seat belt assembly or the seat, where the at least one deployable restraint has a deployed position and a retracted position that is deployed by a deployment member.

3 Claims, 16 Drawing Sheets

(56) References Cited

U.S. PATENT DOCUMENTS

| | | | | |
|---|---|---|---|---|
| 3,953,049 A * | 4/1976 | Surace | | B60R 21/08 |
| | | | | 280/730.1 |
| 4,081,156 A * | 3/1978 | Ideskar | | B64D 25/02 |
| | | | | 244/122 AG |
| 4,215,835 A * | 8/1980 | Wedgwood | | B64D 25/02 |
| | | | | 244/122 AG |
| 4,508,294 A * | 4/1985 | Lorch | | B64D 25/02 |
| | | | | 244/122 AG |
| 4,569,534 A * | 2/1986 | Nalbandyan | | B60N 2/4221 |
| | | | | 297/464 X |
| 4,592,523 A * | 6/1986 | Herndon | | B64D 25/02 |
| | | | | 297/216.1 X |
| 4,667,902 A * | 5/1987 | Zenobi | | B64D 25/02 |
| | | | | 244/122 A |
| 4,749,153 A * | 6/1988 | Herndon | | B64D 25/10 |
| | | | | 244/122 A |
| 5,226,672 A * | 7/1993 | Husted | | B60R 21/08 |
| | | | | 280/733 |
| 5,415,366 A * | 5/1995 | Mastrolia | | B64D 25/02 |
| | | | | 244/122 AG |
| 5,556,129 A * | 9/1996 | Coman | | B60R 21/207 |
| | | | | 280/730.2 |
| 5,806,923 A * | 9/1998 | Tschaschke | | B60N 2/4235 |
| | | | | 297/464 X |
| 5,839,753 A * | 11/1998 | Yaniv | | B60R 21/18 |
| | | | | 280/733 |
| 6,126,194 A * | 10/2000 | Yaniv | | B60R 21/18 |
| | | | | 280/728.1 |
| 6,276,712 B1 * | 8/2001 | Welch | | B60R 21/232 |
| | | | | 280/730.2 |
| 6,308,917 B1 * | 10/2001 | Ruff | | B64D 25/02 |
| | | | | 244/122 AG |
| 6,336,656 B1 * | 1/2002 | Romeo | | B60R 21/18 |
| | | | | 280/733 |
| 6,804,595 B1 | 10/2004 | Quail et al. | | |
| 7,086,663 B2 * | 8/2006 | Honda | | B60R 21/207 |
| | | | | 280/730.2 |
| 7,303,209 B2 * | 12/2007 | Kwok | | B60R 21/08 |
| | | | | 280/749 |
| 7,658,410 B2 * | 2/2010 | Kwok | | B60R 22/04 |
| | | | | 297/464 X |
| 7,703,803 B2 * | 4/2010 | Ekberg | | B60R 21/06 |
| | | | | 280/749 |
| 8,485,551 B2 * | 7/2013 | Dainese | | B60R 21/207 |
| | | | | 280/730.2 |
| 8,556,291 B2 * | 10/2013 | Islam | | B60R 21/20 |
| | | | | 280/730.2 |
| 8,899,619 B2 * | 12/2014 | Fukawatase | | B60R 21/207 |
| | | | | 280/749 |
| 9,132,798 B2 * | 9/2015 | Yasuoka | | B60R 21/233 |
| 9,238,425 B2 * | 1/2016 | Fukawatase | | B60R 21/013 |
| 9,333,931 B1 * | 5/2016 | Cheng | | B60R 21/08 |
| 9,533,651 B1 * | 1/2017 | Ohno | | B60R 21/0134 |
| 9,573,553 B2 * | 2/2017 | Ko | | B60R 21/207 |
| 9,783,155 B2 * | 10/2017 | Kondo | | B60R 22/48 |
| 9,919,673 B2 * | 3/2018 | Ohno | | B60R 21/262 |
| 9,925,943 B2 * | 3/2018 | Ohno | | B60R 21/207 |
| 9,944,246 B2 * | 4/2018 | Ohno | | B60R 21/231 |
| 9,950,687 B2 * | 4/2018 | Kato | | B60R 21/207 |
| 9,981,624 B2 * | 5/2018 | Perlo | | B60R 21/207 |
| 9,994,181 B1 * | 6/2018 | Dubaisi | | B60R 21/207 |
| 10,005,417 B2 * | 6/2018 | Ohno | | B60R 21/2334 |
| 10,093,266 B2 * | 10/2018 | Sugie | | B60R 21/01554 |
| 10,099,643 B2 * | 10/2018 | Sakakibara | | B60N 2/686 |
| 10,112,570 B2 * | 10/2018 | Barbat | | B60N 2/143 |
| 10,189,431 B2 * | 1/2019 | Yamamoto | | B60R 21/207 |
| 10,246,043 B2 * | 4/2019 | Schneider | | B60R 21/207 |
| 10,315,606 B2 * | 6/2019 | Ohno | | B60R 21/207 |
| 10,328,889 B2 * | 6/2019 | Sugie | | B60R 21/233 |
| 10,336,278 B2 * | 7/2019 | Schneider | | B60R 21/207 |
| 10,471,918 B2 * | 11/2019 | Sugie | | B60R 21/0134 |
| 10,471,920 B2 * | 11/2019 | Dry | | B60R 21/233 |
| 10,518,733 B2 * | 12/2019 | Dry | | B60R 21/207 |
| 10,625,704 B2 * | 4/2020 | Dry | | B60R 21/233 |
| 10,632,958 B2 * | 4/2020 | Dry | | B60N 2/14 |
| 10,710,539 B2 * | 7/2020 | Cho | | B60R 21/207 |
| 10,807,551 B2 * | 10/2020 | Deng | | B60N 2/42 |
| 10,850,699 B2 * | 12/2020 | Dry | | B60R 21/231 |
| 2002/0190515 A1 * | 12/2002 | Birk | | B60N 2/42718 |
| | | | | 280/753 |
| 2006/0119082 A1 * | 6/2006 | Peng | | B60R 21/2338 |
| | | | | 280/730.2 |
| 2006/0220365 A1 * | 10/2006 | Kwok | | B60R 21/08 |
| | | | | 280/749 |
| 2006/0279115 A1 * | 12/2006 | Tisdelle | | A42B 3/0473 |
| | | | | 297/216.12 |
| 2007/0018442 A1 * | 1/2007 | Kwok | | B60R 21/08 |
| | | | | 280/749 |
| 2013/0015642 A1 * | 1/2013 | Islam | | B60R 21/231 |
| | | | | 280/730.1 |
| 2014/0042733 A1 * | 2/2014 | Fukawatase | | B60R 21/0136 |
| | | | | 280/730.2 |
| 2017/0259774 A1 * | 9/2017 | Matsushita | | B60R 21/23138 |
| 2017/0291569 A1 * | 10/2017 | Sugie | | B60R 21/2338 |
| 2019/0016293 A1 * | 1/2019 | Saso | | B60R 21/207 |
| 2019/0217803 A1 * | 7/2019 | Dry | | B60R 21/23138 |
| 2019/0275979 A1 * | 9/2019 | Dry | | B60R 21/2338 |
| 2019/0299904 A1 * | 10/2019 | Nagasawa | | B60R 21/207 |
| 2020/0031308 A1 * | 1/2020 | Svanberg | | B60R 22/14 |

FOREIGN PATENT DOCUMENTS

| | | |
|---|---|---|
| DE | 102014016351 A1 | 5/2015 |
| FR | 2928598 A1 | 9/2009 |
| GB | 1388156 A | 3/1975 |
| JP | 2007190944 A | 8/2007 |
| WO | 9728018 A1 | 8/1997 |

* cited by examiner

OCCUPANT RESTRAINT SYSTEM AND RELATED METHODS

TECHNICAL FIELD

The disclosure herein relates to an occupant restraint system and related methods.

TECHNICAL BACKGROUND

As automotive technology progresses towards fully autonomous vehicles it has become apparent that there is a need for an alternative solution to the tradition seat design in the industry. In a traditional seating configuration and design, the seats for the occupants are restricted to placement in a very specific orientation with a predetermined range of travel. This is in part due to safety device architecture and the placement of the safety devices within the vehicle. For instance, in a traditional vehicle, the driver of a vehicle buckles a seat belt anchored to the floor and B-pillar structure of the vehicle, where the seat belts cross the chest and lap of the occupant. The occupants face forward towards a steering wheel or dash panel that houses the main deployable device, which is the airbag contained within the steering wheel or dash. As the realization of fully automated driving is approached, there is an increased demand for a more flexible occupant configuration within the vehicle. Since a fully autonomous vehicle drives itself, there is no longer a need for a driver. The occupants of the vehicle may direct their attention to other endeavors instead of operating the vehicle. A flexible seating configuration will be desired to allow vehicle occupants to interact face-to-face rather than always facing forward. Allowing the seats to swivel or rotate adds complication to the matter of protecting occupants in the event of a crash. The traditional use of airbags deploying from fixed locations in the vehicle will not be effective unless the occupants are facing towards the airbag.

Conventional seating, an occupant is limited to a designed range of translational motion, such as forward and reward, and seat back angle adjust is placed at strategic locations within the vehicle. There is no ability for rotational movement of the seats. In the event of a crash, a seat belt placed across the lap and over the chest holds the occupant in place and an airbag is deployed to manage the energy of the crash to reduce risk of injury. What is needed is a better way to provide protection for occupants in seating with non-conventional configurations.

BRIEF SUMMARY

An occupant restraint system including a seat having a head rest where the seat has a seat belt anchor, a seat belt retractor and a seat coupling member each coupled with the seat. The system further includes a seat belt assembly including a first seat belt portion and a second seat belt portion, where the first seat belt portion extends from a belt anchor portion to a first coupling end portion, the belt anchor portion is coupled with the seat belt anchor, and the first coupling end portion configured to be coupled with the seat coupling member. The second seat belt portion extends from a second extending portion to a second coupling end portion, the second extending portion is extendably coupled with the seat belt retractor, and the second coupling end portion is configured to be coupled with the seat coupling member. At least one deployable restraint is stored on or within at least one of the seat belt assembly or the seat, where the at least one deployable restraint has a deployed position and a retracted position that is deployed by a deployment member.

In one or more embodiments, the seat is rotatable seat defined in part by a first vertical axis, the rotatable seat is rotatable around the first vertical axis.

In one or more embodiments, the rotatable seat has a rotatable mount coupled therewith.

In one or more embodiments, the occupant restraint system further includes a deployment guide, the deployment guide having a track and guide member associated therewith, the guide member coupled with the deployable restraint, the guide member configured to guide the deployable restraint along the track.

In one or more embodiments, the deployable restraint is disposed within the head rest of the seat.

In one or more embodiments, the occupant restraint system further includes at least one hinge configured to fold open the deployable restraint with the deployment member.

In one or more embodiments, the deployable restraint is disposed within the seat belt assembly when the deployable restraint is disposed in the retracted position.

In one or more embodiments, the occupant restraint system further includes a belt guide disposed between the second coupling end portion and the second extending portion, the belt guide coupled with the seat.

In one or more embodiments, an occupant restraint system includes a rotatable seat having a head rest, the rotatable seat coupled with a seat mount, where the rotatable seat includes a seat belt anchor, a seat belt retractor and a seat coupling member each coupled with the rotatable seat, and the seat belt anchor is directly coupled with the rotatable seat. The system further includes a seat belt assembly including a first seat belt portion and a second seat belt portion. The first seat belt portion extends from a belt anchor portion to a first coupling end portion, the belt anchor portion coupled with the seat belt anchor, and the first coupling end portion is configured to be coupled with the seat coupling member.

The second seat belt portion extends from a second extending portion to a second coupling end portion. The second extending portion is extendably coupled with the seat belt retractor, where the second coupling end portion is configured to be coupled with the seat coupling member. At least one deployable restraint is stored on or within at least one of the seat belt assembly or the rotatable seat, and the at least one deployable restraint has a deployed position and a retracted position that is deployed by a deployment member.

In one or more embodiments, the rotatable seat is defined in part by a first vertical axis, the rotatable seat is rotatable around the first vertical axis.

In one or more embodiments, the occupant restraint system further includes a deployment guide, the deployment guide having a track and guide member associated therewith, the guide member coupled with the deployable restraint, the guide member configured to guide the deployable restraint along the track.

In one or more embodiments, the deployable restraint is disposed within the head rest of the rotatable seat.

In one or more embodiments, the occupant restraint system further includes at least one hinge configured to fold open the deployable restraint with the deployment member.

In one or more embodiments, the deployable restraint is disposed within the seat belt assembly when the deployable restraint is disposed in the retracted position.

In one or more embodiments, the occupant restraint system further includes a belt guide disposed between the second coupling end portion and the second extending portion, the belt guide coupled with the seat.

A method of using the occupant restraint system includes deploying the deployable restraint of the embodiments discussed herein, where deploying the deployable restraint from the retracted position to the deployed position, in the deployed position, the deployable restraint configured to contain a neck of an occupant. The method further optionally includes guiding the deployable restraint along a track with a guide member coupled with the deployable restraint. In one or more embodiments, the method further includes folding open the deployable restraint at an at least one hinge. The method further optionally includes removing at least a portion of the deployable restraint from within the seat belt assembly while the deployable restraint is deployed. In one or more embodiments, deploying the deployable restraint includes removing at least a portion of the deployable restraint from within the headrest of the seat.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

An occupant restraint system includes components that are coupled with the seat within a vehicle, such as a driverless vehicle. For example, a seat belt retractor is located on the seat instead of the B-Pillar of the vehicle. The seat belt is anchored at the top of the seat and buckles at the opposite side of the retractor, and in one or more embodiments, the seat belt contains a deployable restraint which can be made of a mesh or netting material that is strong enough to retain the head and neck of an occupant in the event of a crash of the vehicle. In the normal non-crash position, the deployable restraint is disposed within the seat belt or within the seat, such as the head rest of the seat. If a crash is detected by a sensor system, a control unit for the deployable restraint can deploy the deployable restraint, for example, by activating a motorized retractor spool, located for example near the top of the seat, which rotates and pulls on a cable along a track.

Figure 1:
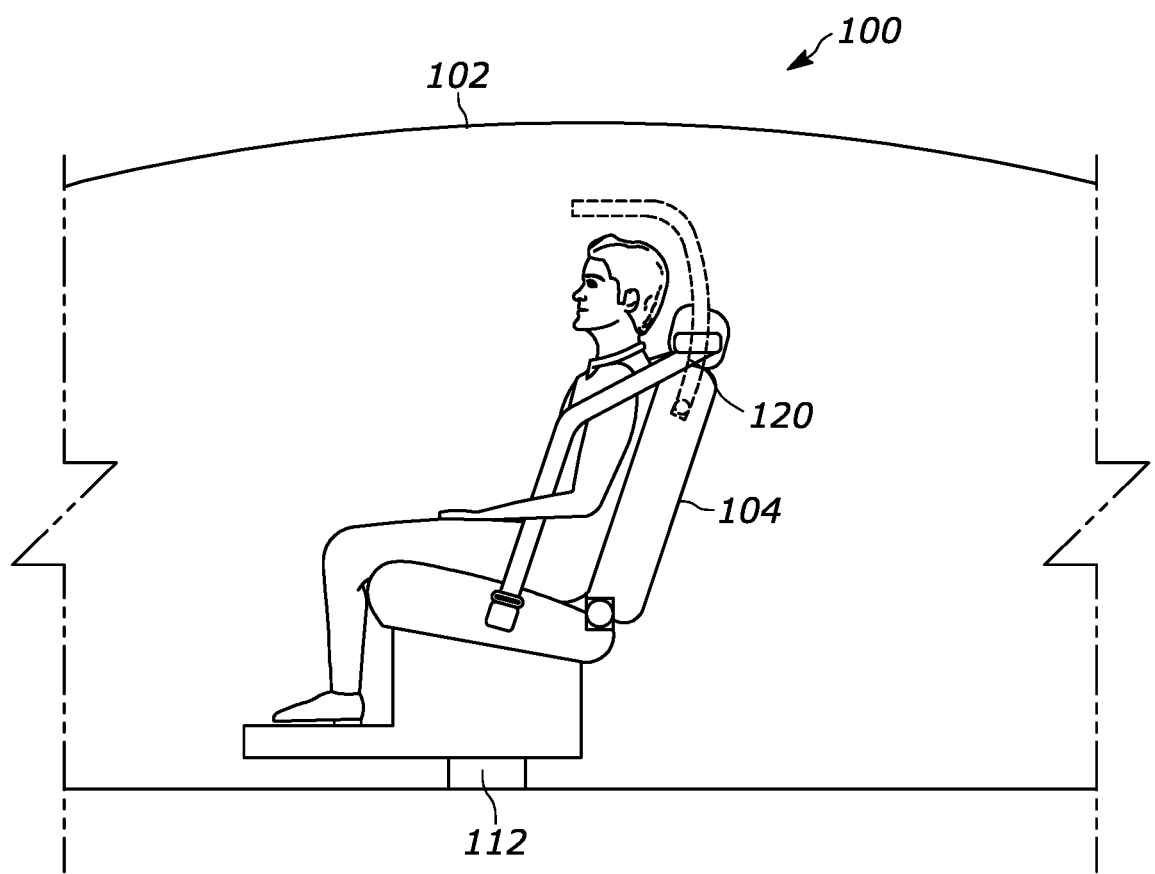
FIG. 1 illustrates a side view of an occupant restraint system in a vehicle, as constructed in accordance with one or more embodiments.

FIGS. 1-7B illustrate the occupant restraint system in greater detail. FIG. 1 illustrates a vehicle 102 having an occupant restraint system 100. The occupant restraint system 100 includes a seat 104, a seat belt assembly 120, and at least one deployable restraint assembly 150 (FIGS. 3A-3C, 5A-5B). The at least one deployable restraint is stored on or within at least one of the seat belt assembly 120 or the seat 104. The deployable restraint has a deployed position and a retracted, undeployed position.

FIGS. 2A-2D, 4A-4B, 6A-6B, 7A illustrate the occupant restraint system 100 in an undeployed position. The occupant restraint system includes a seat 104 having a head rest 116. In one or more embodiments, the seat 104 is rotatable and includes the seat mount 112 which connects the seat 104 with the vehicle 102. In one or more embodiments, the seat 104 is rotatable. In one or more embodiments, the rotatable seat 104 is defined in part by a first vertical axis 114, and the rotatable seat is rotatable around the first vertical axis 114, as shown in FIGS. 1-5B. In one or more embodiments, the seat 104 is movable to place the occupant in a reclined or prone configuration, as shown in FIGS. 6A-7B, and as further described in co-pending application Ser. No. 16/703,222, filed on Dec. 12, 2019, which incorporated herein by reference in its entirety. In one or more embodiments, the seat 104 is both rotatable around a vertical axis and movable to place the occupant in a reclined or prone configuration. In one or more embodiments, the seat 104 is movable from an upright position (FIGS. 1-6A) to a reclined position (FIGS. 6B-7B). In one or more embodiment, the seat 104 is movable from the upright position to the reclined position via a drive rail 190 and a drive motor 192. The seat 104 is coupled with the drive rail 190, and the drive motor 192 is used to move the drive rail 190, which in turn moves the seat 104 from the upright position to the reclined position, or somewhere in between.

The seat 104 further optionally includes a mount 112, such as a rotatable mount that is coupled with the vehicle 102, such as the frame of the vehicle to provide stability to the seat 104, and to the seat belt assembly 120 which is coupled directly to the seat 104. The seat 104 has a seat belt anchor 132, a seat belt retractor 130, and a seat coupling member 134 each coupled with the seat 104.

The seat belt assembly 120 includes a first seat belt portion 121 and a second seat belt portion 122. The first seat belt portion 121 and the second seat belt portion 122 collectively form one seat belt that extends through a seat belt coupler 134. The first seat belt portion 121 extends from a belt anchor portion 128 to a first coupling end portion 126. The belt anchor portion 128 is coupled with the seat belt anchor 132, which is coupled with the seat 104. The first coupling end portion 126 is configured to be coupled with the seat coupling member 134, for example via the second seat belt portion 122, which is also coupled with the seat 104. In one or more embodiments, the seat coupling member 134 is a seat buckle. In one or more embodiments, the first seat belt portion 121 is configured to be disposed across the chest of an occupant, as shown in FIGS. 2A-3C. In one or more embodiments, the first seat belt portion 121 is configured to be disposed across a lap of an occupant, as shown in FIGS. 4A-5B.

The second seat belt portion 122 extends from a second extending portion 124 to a second coupling end portion 126, where the second extending portion 124 is extendably coupled with the seat belt retractor 130, which is coupled directly with the seat 104. The seat belt retractor 130 allows for the seat belt to be extended and retracted from and to the seat belt retractor 130, as the occupant installs and/or removes the seat belt. The second coupling end portion 126 is configured to be coupled with the seat coupling member 134 and/or extends through the coupling member 134, which is also coupled with the seat 104. In one or more embodiments, the second seat belt portion 122 is configured to be disposed across a lap of an occupant, as shown in FIGS. 2A-3C. In one or more embodiments, the second seat belt portion 122 is configured to be disposed across a chest of an occupant, as shown in FIGS. 4A-5B. In one or more embodiments, the second seat belt portion 122 is configured to be disposed across a chest of an occupant, and further behind the back of an occupant, as shown in FIGS. 4A-5B. In an optional configuration, the second seat belt portion 122 extends through a guide 138 which is coupled with the seat 104. In one or more embodiments, the second seat belt portion 122 is coupled with a retractor 130 that is located at a lower portion of the seat 140, as shown in FIGS. 4A-4B.

As mentioned above, the system 100 includes a deployable restraint assembly 150, which includes a restraint 152 and restraint deployment member 170. In one or more embodiments, the restraint 152 includes a netting or mesh, which when in the deployed position, is configured to capture the head, neck, and/or chest of an occupant. The restraint 152 is compliant and/or has some elasticity so that it does not provide a rigid enclosure which may otherwise injure the occupant during an accident. In one or more embodiments, the netting including openings to provide, among other things, additional resiliency. In one or more embodiments, the openings are small enough to not allow typically sized adult human noses to extend through the openings and/or get hooked by the openings.

In one or more embodiments, the deployable restraint assembly 150 is configured to deploy the restraint 152 with the restraint deployment member 170 when a crash sensor determines a crash is about to occur.

Figure 2A:
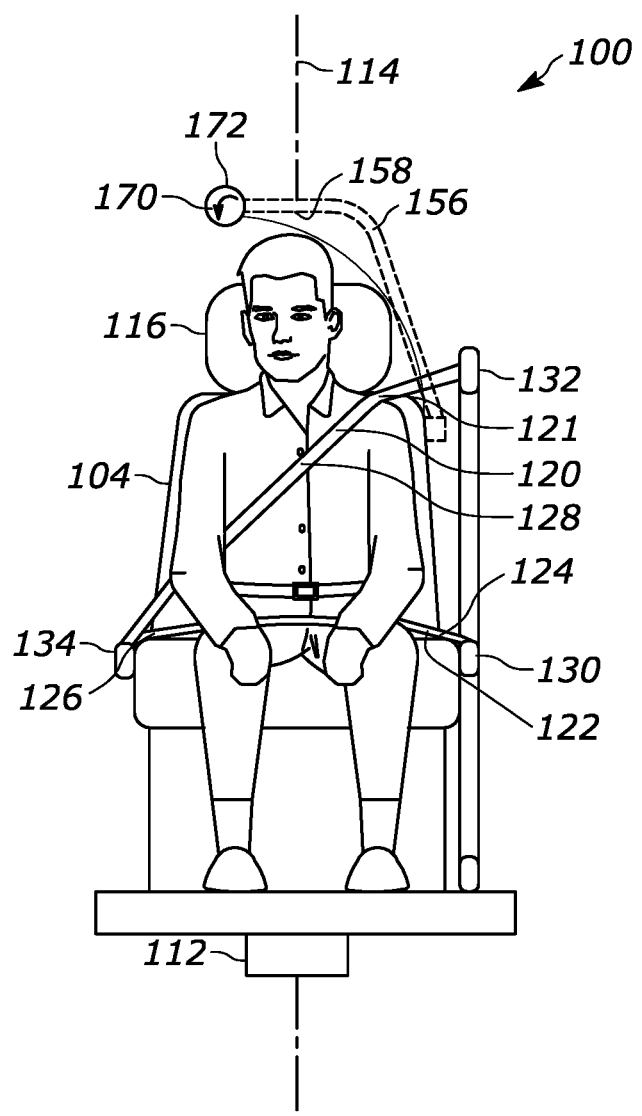
FIG. 2A illustrates a front view of an occupant restraint system, as constructed in accordance with one or more embodiments.
Figure 2B:
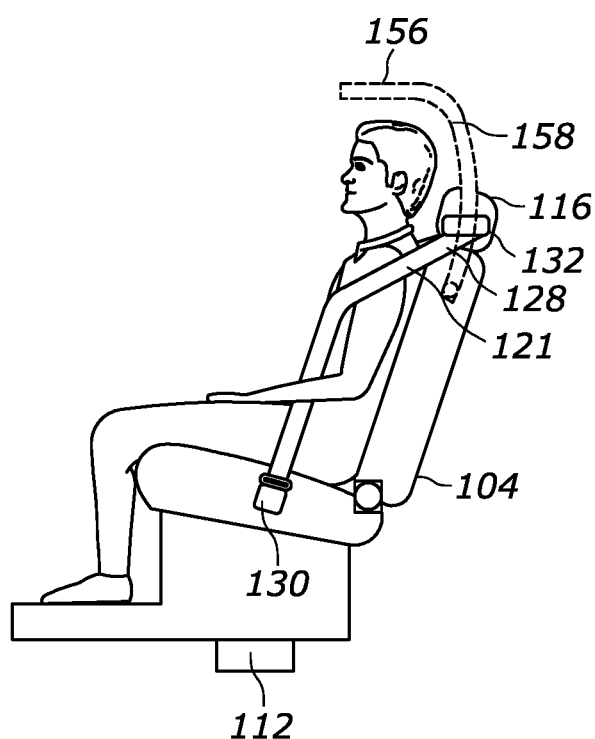
FIG. 2B illustrates a side view of an occupant restraint system, as constructed in accordance with one or more embodiments.
Figure 2C:
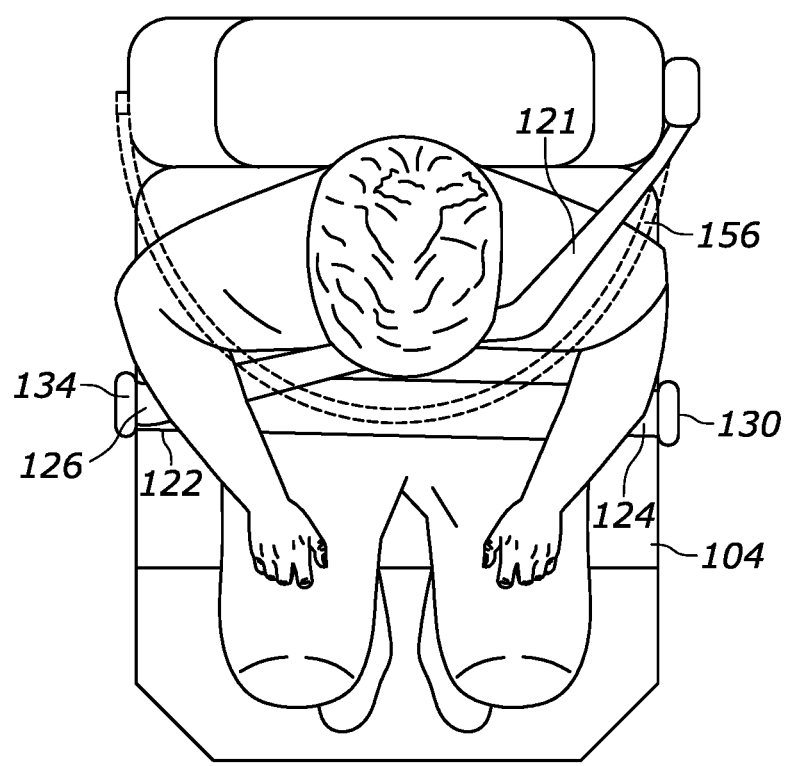
FIG. 2C illustrates a top view of an occupant restraint system, as constructed in accordance with one or more embodiments.
Figure 3A:
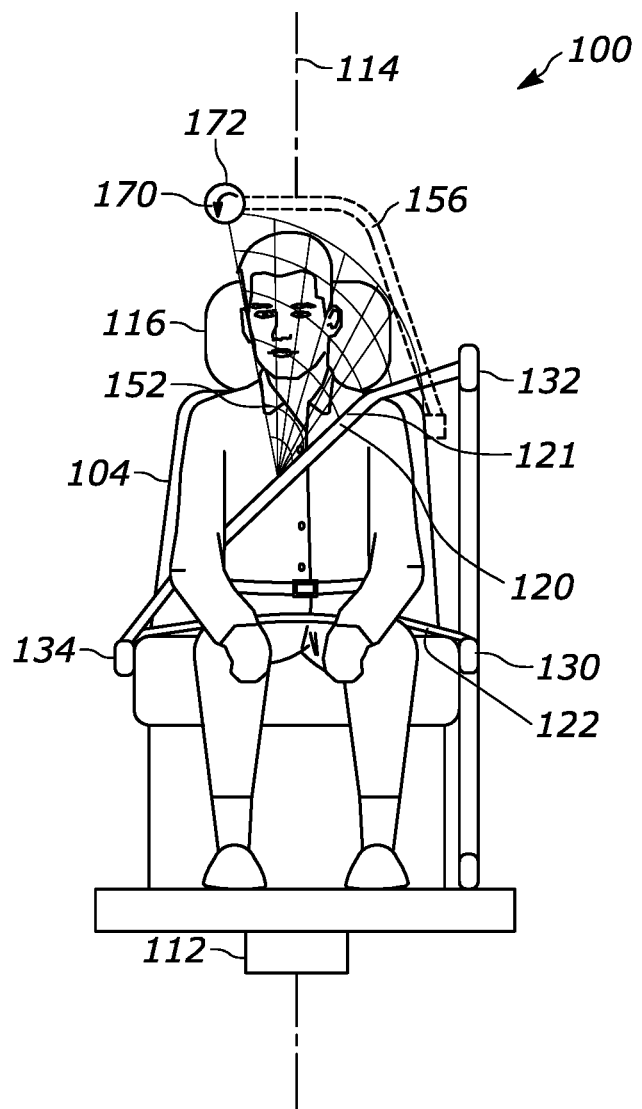
FIG. 3A illustrates a front view of an occupant restraint system, as constructed in accordance with one or more embodiments.
Figure 3B:
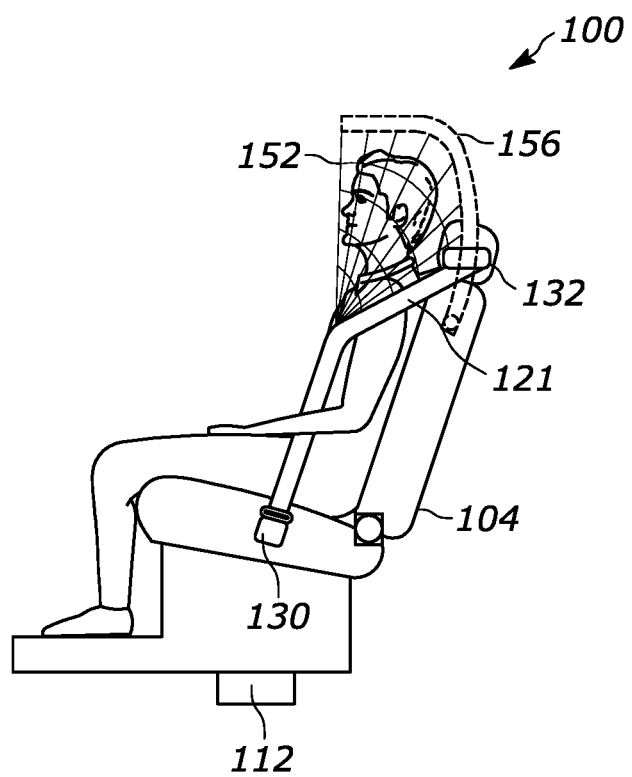
FIG. 3B illustrates a side view of an occupant restraint system, as constructed in accordance with one or more embodiments.
Figure 3C:
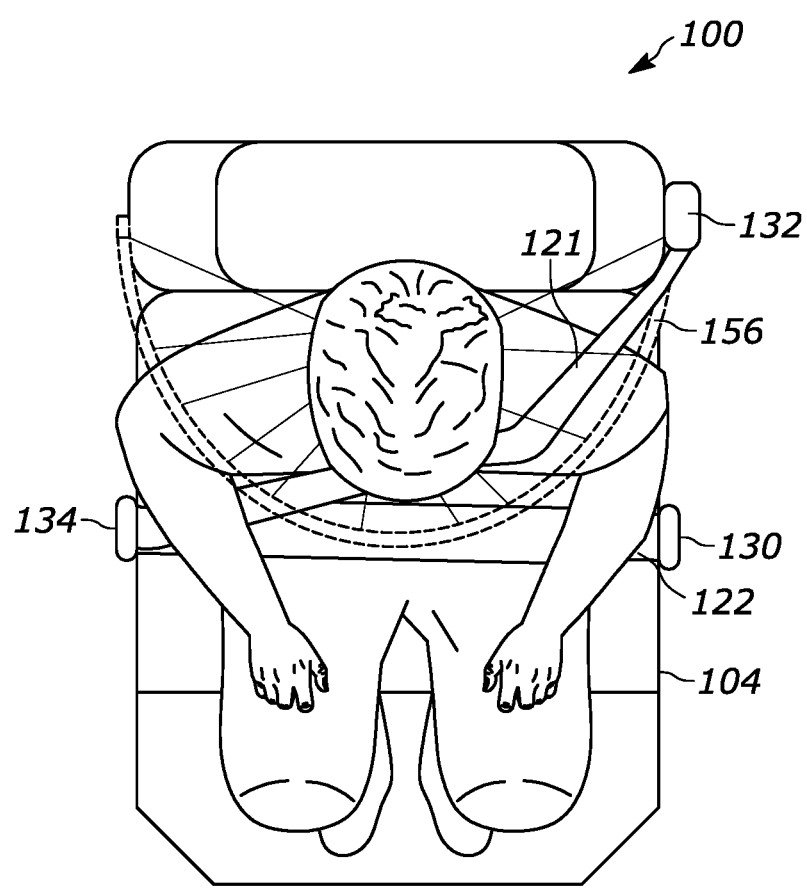
FIG. 3C illustrates a top view of an occupant restraint system, as constructed in accordance with one or more embodiments.
Figure 4A:
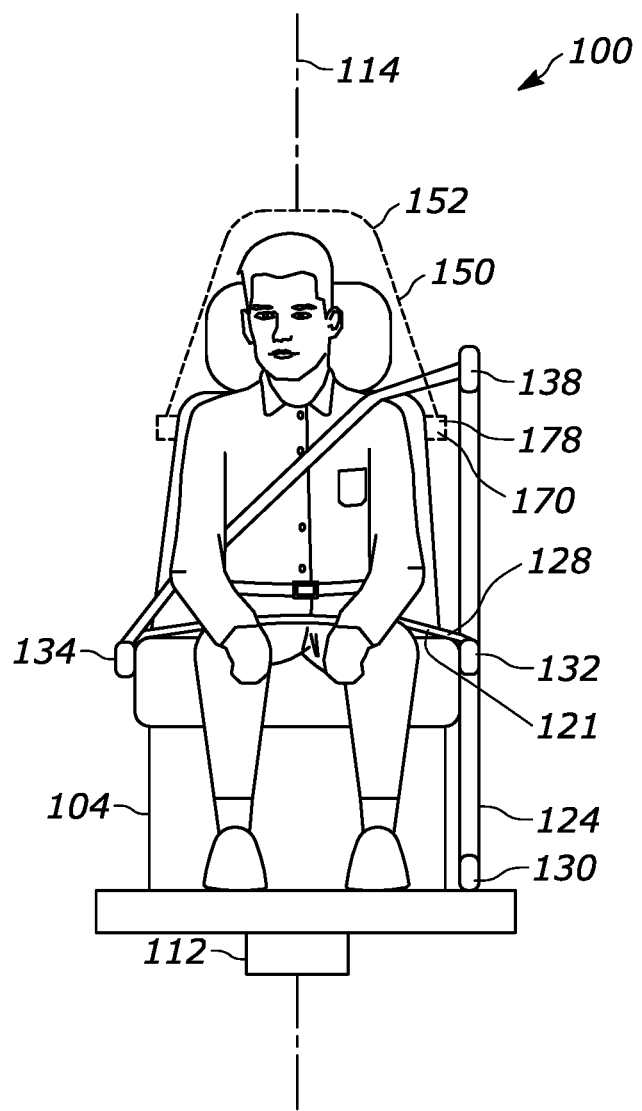
FIG. 4A illustrates a front view of an occupant restraint system, as constructed in accordance with one or more embodiments.
Figure 4B:
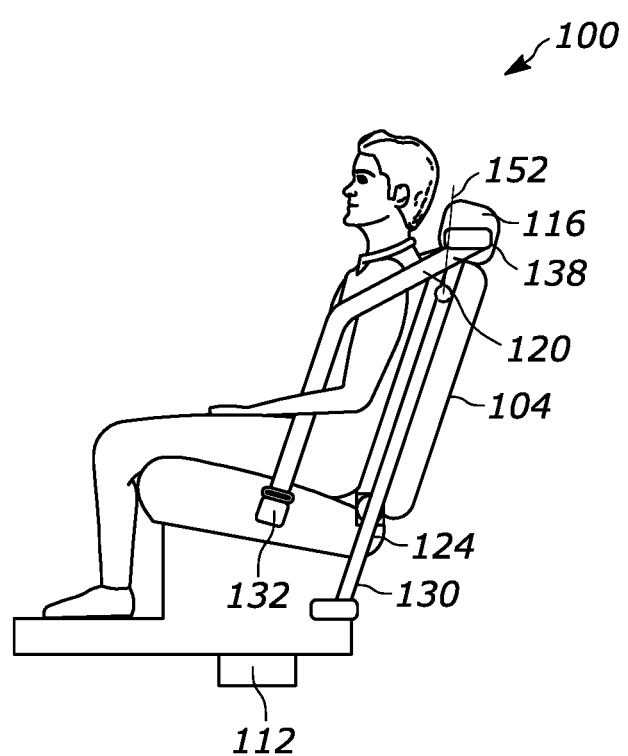
FIG. 4B illustrates a side view of an occupant restraint system, as constructed in accordance with one or more embodiments.

In one or more embodiments, the deployable restraint assembly 150 includes a restraint track 156 coupled with the seat 104 and a restraint 152 that is disposed within the seat belt assembly 120, as shown in FIGS. 2A-2C, 3A-3C, and 7A-7B. The restraint track 156 is disposed, in one or more embodiments, at a vertical location above an occupant's head. In one or more embodiments, the restraint track 156 extends outwardly in a horizontal direction, as shown in FIGS. 2C and 3C and extends from a first end to a second end. The restraint track 156 extends out horizontally, in one or more embodiments, a greater distance than a size or position of an occupant head, neck, and/or chest. In one or more embodiments, the restraint track 156 has a generally curved, for example, but not limited to, a semi-circular shaped track.

The deployable restraint assembly 150 further includes the restraint deployment member 170, which is used to deploy the restraint 152 from an undeployed position to a deployed position. In one or more embodiments, the restraint deployment member 170 includes a motor, a motorized retractor spool, or a pyrotechnic device that allows for the restraint 152 to be quickly deployed so that the occupant can be restrained in time for the collision. The restraint deployment member 170 includes a restraint cable 158 that is coupled with the restraint 152. The restraint cable 158 travels along the restraint track 156 when the restraint 152 is deployed. In one or more embodiments, when it has been determined that the restraint 152 is to be deployed, for example when the crash sensor assembly senses a collision is imminent, the motorized retractor spool 172 reels in the restraint cable 158 which pulls the restraint 152 out from within the seat belt assembly 120, and along the restraint track 156. After the restraint 152 is pulled into the deployed position, the restraint 152 surrounds at least a portion of the occupant's head, neck, and/or chest.

In one or more embodiments, the deployable restraint assembly 150 is integrated into the seat 104, as shown in FIGS. 4A-4B, 5A-5B, and 6A-6B. The restraint 152 is stored within the upper portion of the seat 104, such as within the head rest 116, or within trim of the seat 104. The deployable restraint assembly 150 includes the restraint 152 which hinges at an at least one hinge 178. In one or more embodiments, the at least one hinge 178 is located a height near a neck of a full size or adult occupant.

Figure 5A:
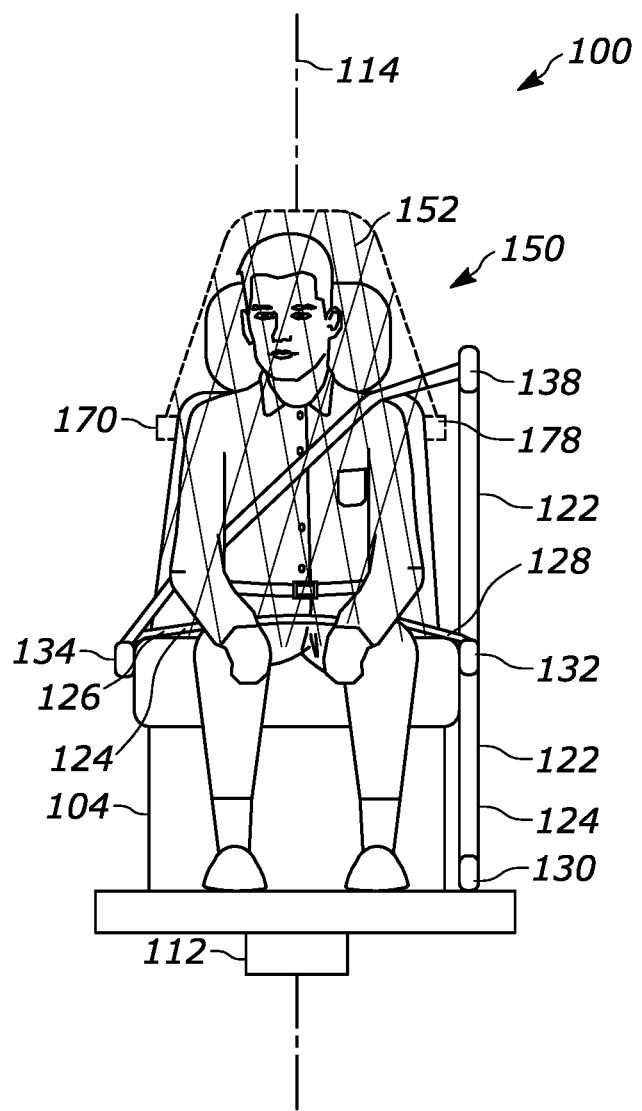
FIG. 5A illustrates a front view of an occupant restraint system, as constructed in accordance with one or more embodiments.
Figure 5B:
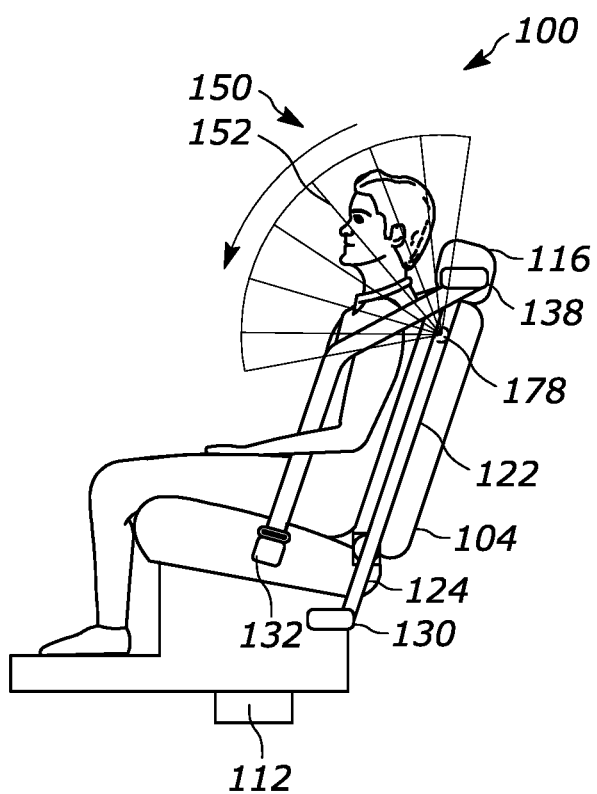
FIG. 5B illustrates a side view of an occupant restraint system, as constructed in accordance with one or more embodiments.
Figure 6A:
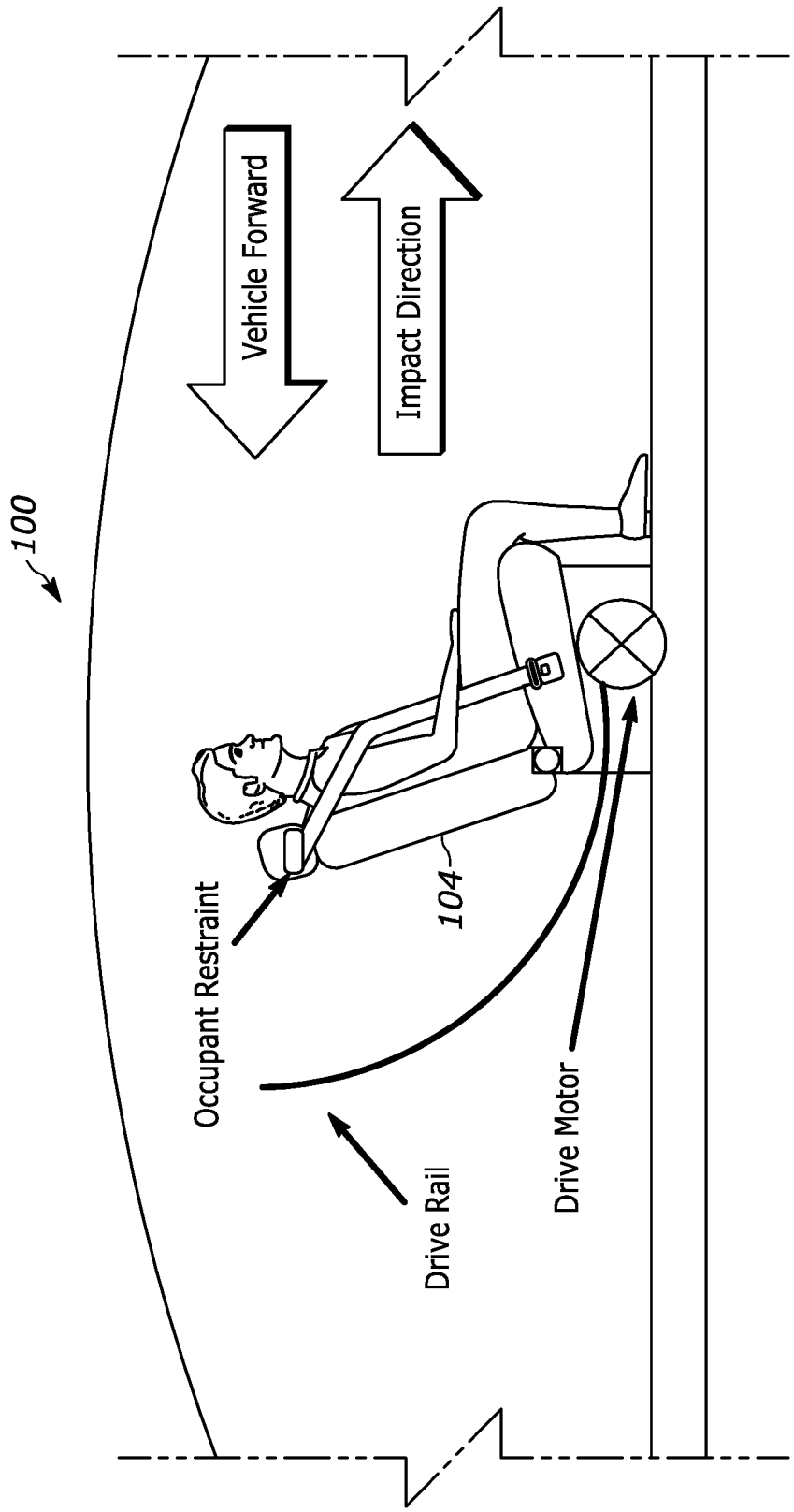
FIG. 6A illustrates a side view of an occupant restraint system, as constructed in accordance with one or more embodiments.
Figure 6B:
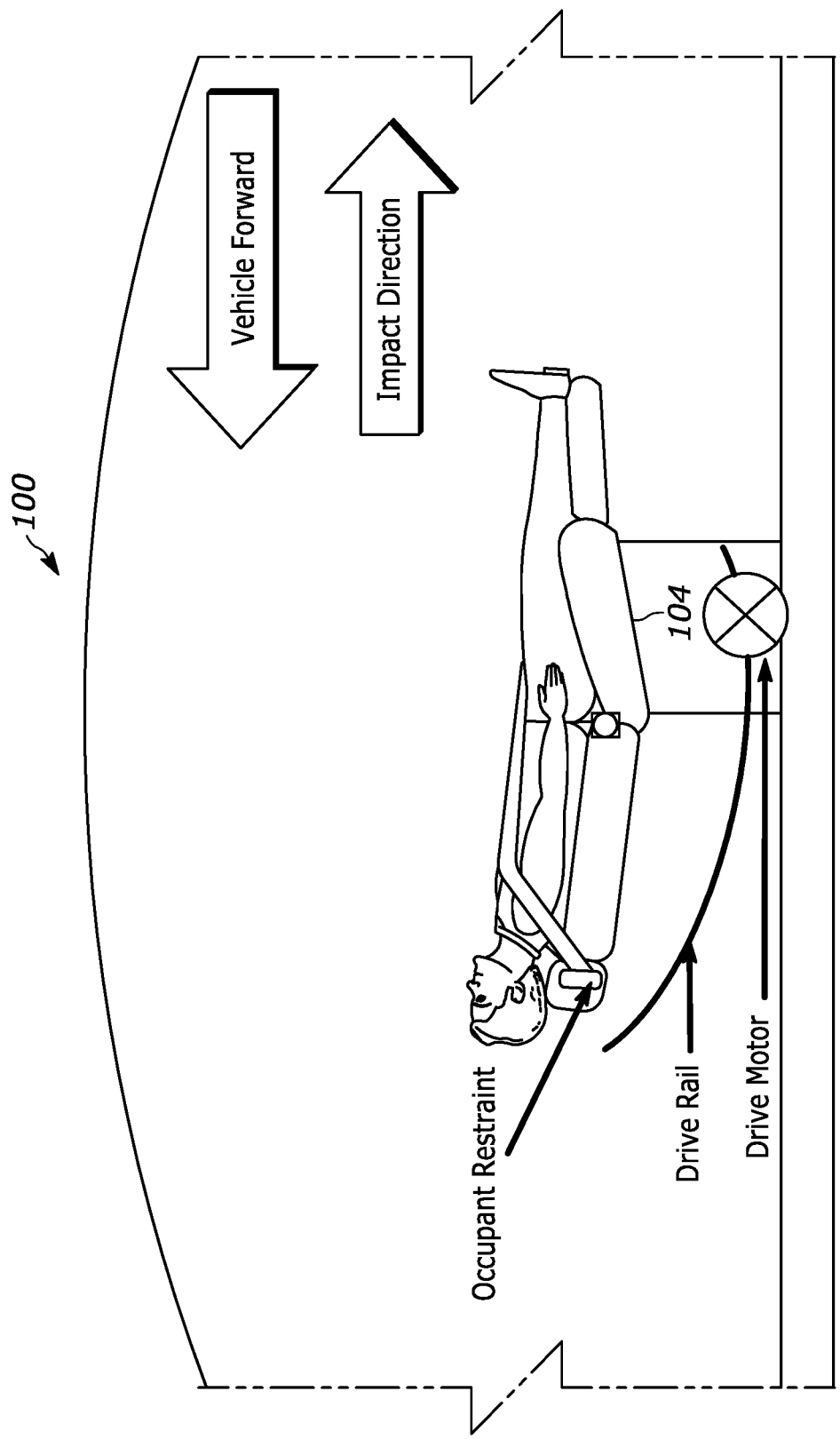
FIG. 6B illustrates a side view of an occupant restraint system, as constructed in accordance with one or more embodiments.
Figure 6C:
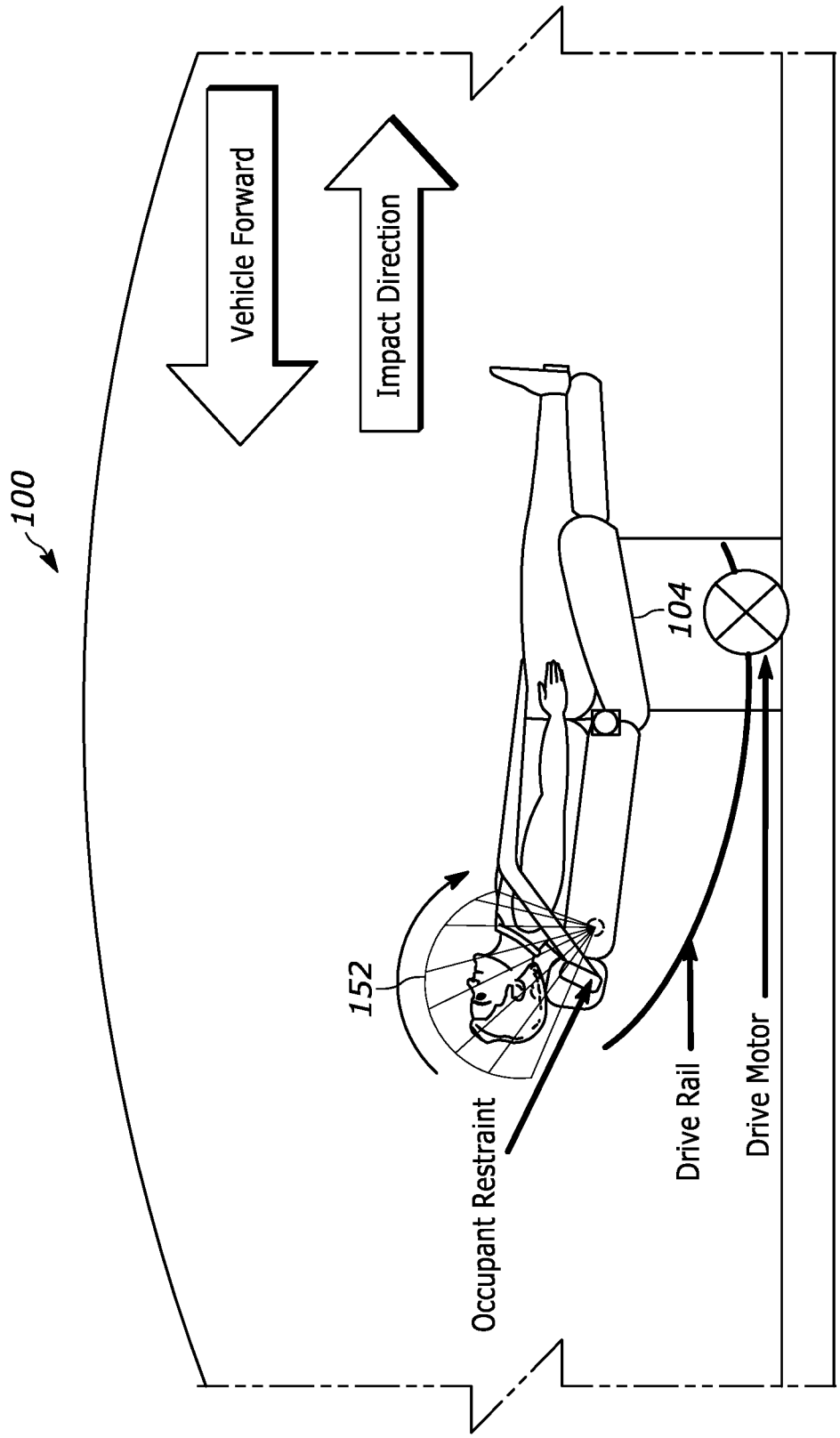
FIG. 6C illustrates a side view of an occupant restraint system, as constructed in accordance with one or more embodiments.
Figure 7A:
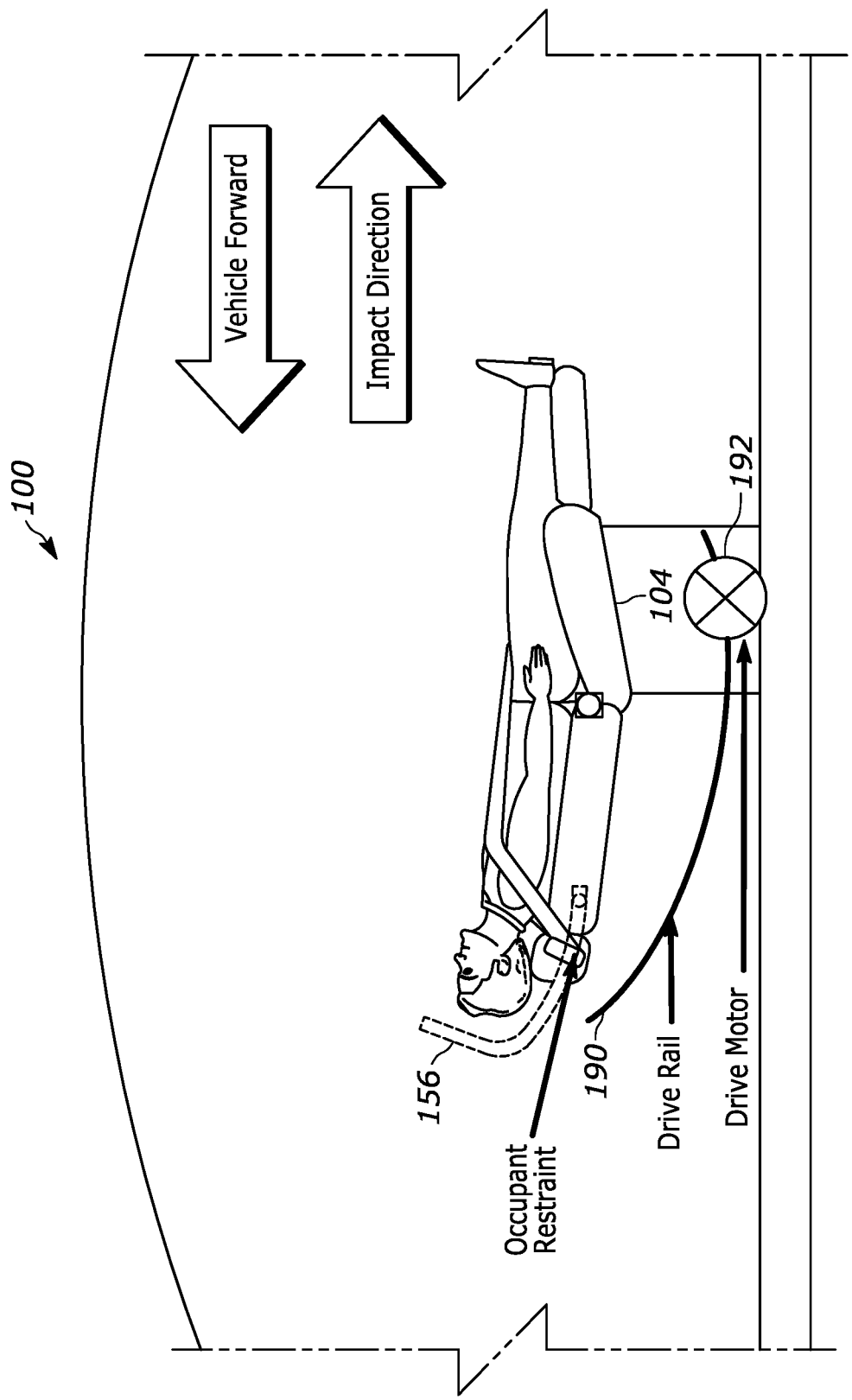
FIG. 7A illustrates a side view of an occupant restraint system, as constructed in accordance with one or more embodiments.
Figure 7B:
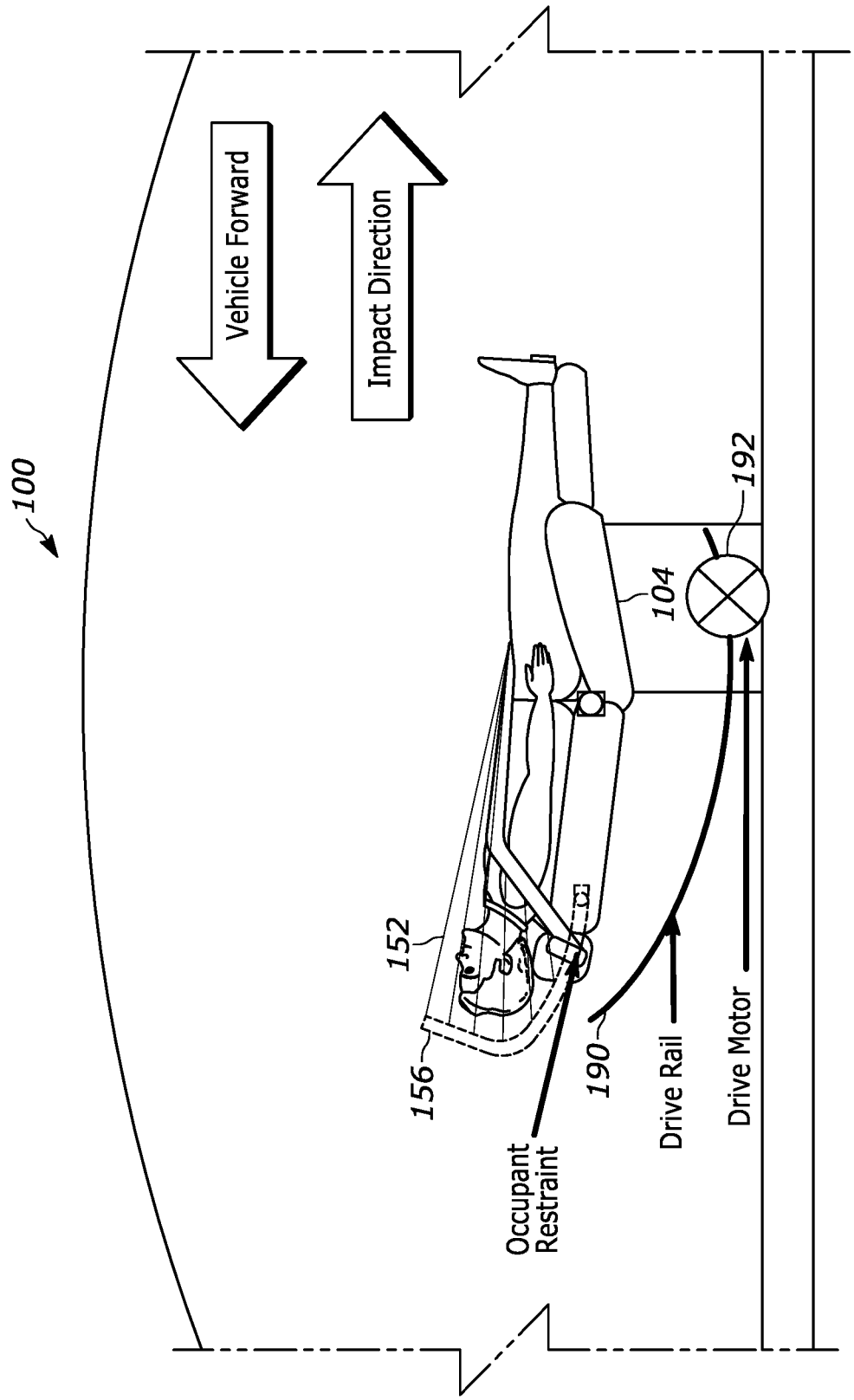
FIG. 7B illustrates a side view of an occupant restraint system, as constructed in accordance with one or more embodiments.

The deployable restraint assembly 150 further includes the restraint deployment member 170, which is used to deploy the restraint 152 from an undeployed position to a deployed position. In one or more embodiments, the restraint deployment member 170 includes a motor, or a pyrotechnic device that allows for the restraint 152 to be quickly deployed so that the occupant can be restrained in time for the collision. As the restraint 152 is deployed, the restraint 152 rotates about the at least one hinge 178 as shown in FIGS. 5A-5B along the curved arrow line. Once the restraint 152 is draped over the occupant, the restraint 152 ultimately lies closer to the occupant to better restrain the occupant's head and neck during the collision. The restraint 152 can be formed of mesh or netting material. In one or more embodiments, the restraint 152 material has some amount of elasticity to manage the crash energy of the occupant.

A method of using the occupant restraint system includes deploying the deployable restraint of the embodiments discussed herein, where deploying the deployable restraint from the retracted position to the deployed position, in the deployed position, the deployable restraint configured to contain a neck of an occupant. The method includes sensing whether a collision is about to occur, or is imminent, and sending a signal to the occupant restraint system in order to deploy the deployable restraint.

The method further optionally includes guiding the deployable restraint along a track with a guide member coupled with the deployable restraint. For example, a restraint deployment member is used to deploy the deployable restraint, using a motor or pyrotechnic. In one or more embodiments, the method further includes folding open the deployable restraint at the at least one hinge. The method further optionally includes removing at least a portion of the deployable restraint from within the seat belt assembly while the deployable restraint is deployed. In one or more embodiments, deploying the deployable restraint includes removing at least a portion of the deployable restraint from within the headrest of the seat.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. An occupant restraint system comprising:
   a rotatable seat having a head rest, the rotatable seat coupled with a seat mount;
   the rotatable seat including a seat belt anchor, a seat belt retractor and a seat coupling member each coupled with the rotatable seat, the seat belt anchor directly coupled with the rotatable seat;
   a seat belt assembly including a first seat belt portion and a second seat belt portion;
   the first seat belt portion extending from a belt anchor portion to a first coupling end portion, the belt anchor portion coupled with the seat belt anchor, the first coupling end portion configured to be coupled with the seat coupling member;
   the second seat belt portion extending from a second extending portion to a second coupling end portion, the second extending portion extendably coupled with the seat belt retractor, the second coupling end portion configured to be coupled with the seat coupling member;
   at least one deployable restraint stored within the head rest of the rotatable seat, the at least one deployable restraint has a deployed position and a retracted position that is deployed by a deployment member;
   at least one hinge configured to fold open the at least one deployable restraint with the deployment member; and
   a deployment guide, the deployment guide having a track and guide member associated therewith, the guide member coupled with the deployable restraint, the guide member configured to guide the deployable restraint along the track.

2. The occupant restraint system as recited in claim 1, wherein the rotatable seat is defined in part by a first vertical axis, the rotatable seat is rotatable around the first vertical axis.

3. The occupant restraint system as recited in claim 1, further comprising a belt guide disposed between the second coupling end portion and the second extending portion, the belt guide coupled with the seat.

* * * * *